US012627513B2

(12) United States Patent
Tan et al.

(10) Patent No.: US 12,627,513 B2
(45) Date of Patent: May 12, 2026

(54) METHODS AND APPARATUS TO DERIVE AND VERIFY VIRTUAL PHYSICAL UNCLONABLE KEYS

(71) Applicant: Altera Corporation, San Jose, CA (US)

(72) Inventors: Tat Kin Tan, Penang (MY); Siew Chin Lim, Penang (MY); Boon Khai Ng, Penang (MY)

(73) Assignee: Altera Corporation, San Jose, CA (US)

( * ) Notice: Subject to any disclaimer, the term of this patent is extended or adjusted under 35 U.S.C. 154(b) by 62 days.

(21) Appl. No.: 17/556,979

(22) Filed: Dec. 20, 2021

(65) Prior Publication Data

US 2022/0116234 A1 Apr. 14, 2022

(51) Int. Cl.
*H04L 9/32* (2006.01)
*H04L 9/08* (2006.01)

(52) U.S. Cl.
CPC .......... *H04L 9/3278* (2013.01); *H04L 9/0825* (2013.01); *H04L 9/0869* (2013.01)

(58) Field of Classification Search
CPC ... H04L 9/3278; H04L 9/0825; H04L 9/0869; H04L 9/0866; H04L 9/0897; G06F 21/44; G06F 21/57; G06F 21/73; G09C 1/00
See application file for complete search history.

(56) References Cited

U.S. PATENT DOCUMENTS

| | | | |
|---|---|---|---|
| 11,340,978 B2 | 5/2022 | Tan et al. | |
| 11,985,236 B2 * | 5/2024 | Hunacek | H04L 9/0841 |
| 2006/0101454 A1 * | 5/2006 | Whitehead | G06F 21/121 |
| | | | 717/168 |
| 2017/0177302 A1 * | 6/2017 | Tan | G06F 7/588 |
| 2017/0288869 A1 * | 10/2017 | Li | H04L 9/0866 |
| 2019/0250969 A1 | 8/2019 | Tan et al. | |
| 2022/0012106 A1 | 1/2022 | Tan et al. | |
| 2022/0129252 A1 | 4/2022 | Abdul Rashid et al. | |
| 2022/0171659 A1 | 6/2022 | Tan et al. | |
| 2022/0376920 A1 * | 11/2022 | Aune | H04L 9/0877 |

OTHER PUBLICATIONS

European Patent Office, "Extended European Search Report," issued in connection with European Patent Application No. 22206990, dated May 16, 2023, 9 pages.
Fyrbiak et al., "Combined HW-SW adaptive clone-resistant functions as physical security anchors," 2013 NASA/ESA Conference on Adaptive Hardware and Systems (AHS-2013), IEEE, dated Jun. 24, 2013, 8 pages.

(Continued)

*Primary Examiner* — Phy Anh T Vu
(74) *Attorney, Agent, or Firm* — Nicholson De Vos Webster & Elliott LLP

(57) ABSTRACT

Methods, apparatus, systems, and articles of manufacture are disclosed. An example apparatus includes: instructions; and processor circuitry to execute the instructions to: retrieve a random number and a physical unclonable function (PUF) from a trusted environment; generate a virtual PUF (vPUF) based on a trusted operation including the random number and the PUF; and store the vPUF and the random number in a persistent storage.

18 Claims, 11 Drawing Sheets

(56)     References Cited

OTHER PUBLICATIONS

Mulhem et al., "Mini-Block-Based Cipher Class for Physically Clone-Resistant Devices," 2019 Eighth International Conference on Emerging Security Technologies (EST), IEEE, Jul. 22, 2019, 6 pages.

Sampangi et al., "HiveSec: security in resource-constrained wireless networks inspired by beehives and bee swarms," International Journal of Information Security, dated Jul. 6, 2016, 17 pages.

Mulhem et al., "Security and Complexity Bounds of SUC-Based Physical Identity," 2018 NASA/ESA Conference on Adaptive Hardware and Systems (AHS), IEEE, dated Aug. 6, 2018, 6 pages.

Mulhem et al., "Chaining trusted links by deploying secured physical identities," 2017 Seventh International Conference on Emerging Security Technologies (EST), IEEE, dated Sep. 6, 2017, 6 pages.

* cited by examiner

600

START

Receive vPUF key from
verification circuitry — 602

Receive random number
associated with vPUF key from
verification circuitry — 604

Request PUF key from Low
Level Management Circuitry — 606

Perform trusted operation — 608

Provide verification result to
verification circuitry — 610

END

700

START

Retrieve Random number
associated with vPUF data from
secure database                    702

Provide vPUF and Associated
random number to vPUF
Management Circuitry               704

Receive verification result from
vPUF Management Circuitry          706

Provide verification result to
microservice management
circuitry                          708

END

METHODS AND APPARATUS TO DERIVE AND VERIFY VIRTUAL PHYSICAL UNCLONABLE KEYS

FIELD OF THE DISCLOSURE

This disclosure relates generally to generation and management of unique identifiers and, more particularly, to methods and apparatus to derive and verify virtual physical unclonable keys.

BACKGROUND

A unique identifier (UID) is a value unique to an individual device. UIDs may be randomly generated and securely stored on a device at manufacture. A physical unclonable function (PUF) is a physical object that provides a physically defined output. PUFs generate a consistent output that can be used as a UID.

UIDs and PUFs may be used as cryptographic keys to lock/unlock data. Cryptographic keys are used throughout computing to secure information.

Figure 1:
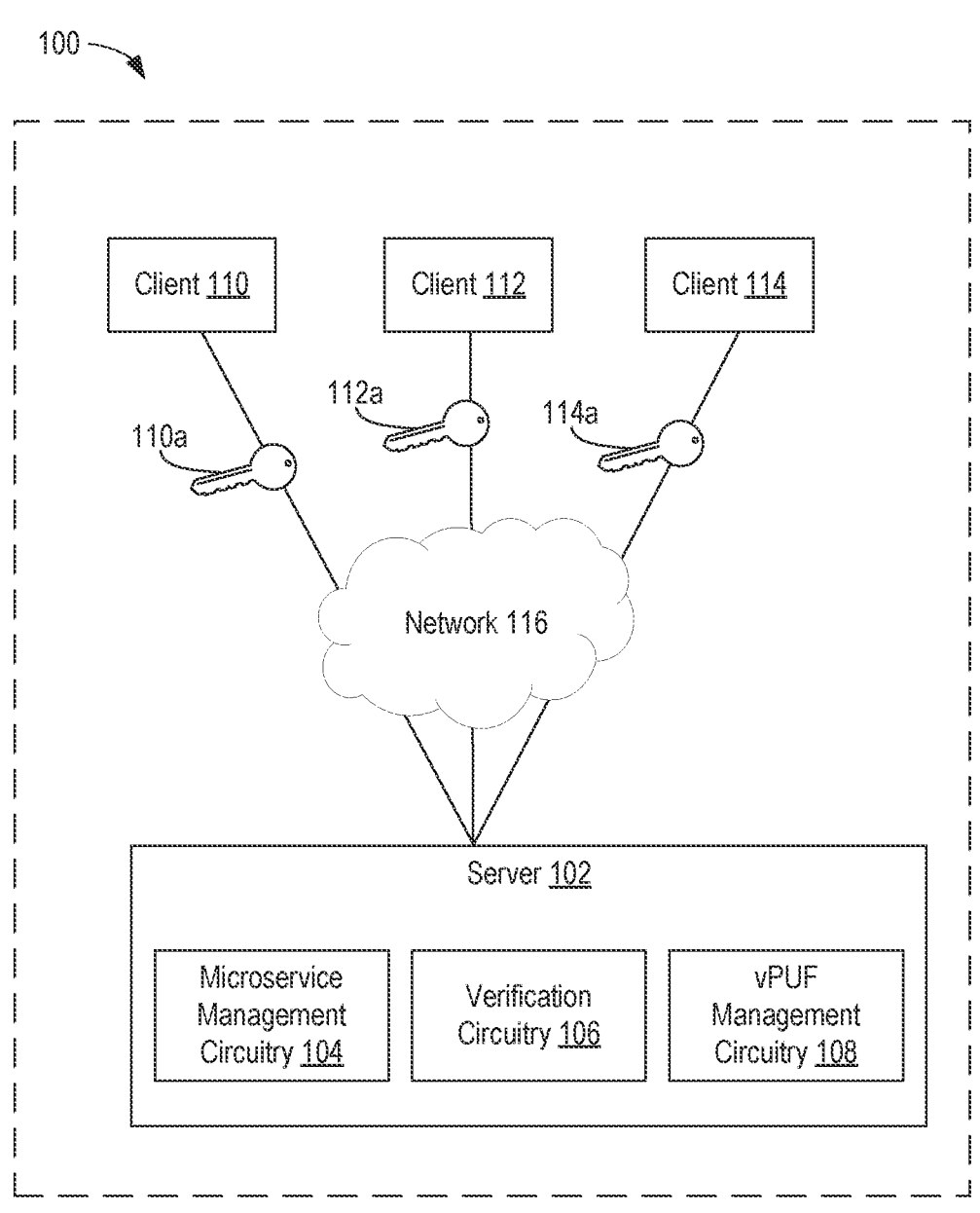
FIG. 1 is a block diagram of an example system to derive and verify physical unclonable keys.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Notwithstanding the foregoing, in the case of a semiconductor device, "above" is not with reference to Earth, but instead is with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Electronic device manufacturers store secret information in electronic devices, for example, for security purposes. For example, the secret information can be used to ensure only trusted code executes on a device. However, electronically stored secret information is susceptible to unauthorized attack. Attackers can physically extract information stored in a circuit. For example, attackers may use a focused ion beam to edit an integrated circuit and extract secret information from the device.

A physical unclonable function (PUF) is a physical object that provides a physically defined output. In electronic devices, PUFs are circuitry that generate consistent output based on physical characteristics of the circuitry. PUFs are based on a challenge-response authentication process. When a physical stimulus (e.g., a voltage) is applied to a structure, an unpredictable, but repeatable, output is generated due to interactions of the physical microstructure of the device. The physical microstructure depends on manufacturing tolerances, imperfections, etc., introduced during manufacture and is not reproducible.

Physical attacks on PUF circuitry alter the specific microstructural characteristics of the circuitry, destroying the PUF. Therefore, PUFs can generate secret information that is not susceptible to physical attack, improving upon traditional secrets stored in memory.

PUFs can be based on hardware such as a ring oscillator. Ring oscillators include inverters that exhibit a propagation delay. The propagation delay is based on physical characteristics (threshold voltage, capacitance, etc.) of each transistor in the ring oscillator. The unique propagation delay causes a unique output frequency that can be used to generate a unique output. PUFs are not limited to ring oscillators, however, and may be based on multiplexers, arbiters, or any other electronic circuitry based on similar principles (e.g., wire and gate delay).

Secret information is not only generated and used at device manufacture. Information is commonly secured by encryption, in which digital data is transformed and can only be recovered with secret information (e.g., a key) used to decrypt the transformed information. A cryptographic key typically includes a string of binary digits, stored in non-volatile memory, used to lock or unlock cryptographic functions. For example, a single cryptographic key may be based on a timestamp, a pseudorandom number, etc., and be retrieved from persistent storage to access secure data. However, traditional cryptographic keys are electronically stored and are therefore susceptible to unauthorized physical attack as described above.

Although cryptographic keys based on PUFs (e.g., PUF keys) are not susceptible to physical attack, PUF keys have, until now, been limited by reliance on physical hardware. As each PUF key's uniqueness is tied to physical hardware, PUF keys have been unable to scale to meet demand for digitally encrypted data. For example, an attacker that gains access to a traditional PUF key can access all the data secured by the PUF key.

Examples disclosed herein improve the cryptographic functionality of electronic circuits by generating multiple virtual physical unclonable function (vPUF) keys from a single PUF key. Examples disclosed herein describe an example apparatus derive and verify a plurality of physical unclonable keys (e.g., vPUFs) from a single PUF. Examples disclosed herein allow device manufacturers to scale PUFs efficiently, and solve at least the problems associated with FPGAs described below.

A first problem associated with traditional PUFs in FPGAs is that traditional PUFs often rely on a device driver model, in which hardware IP (e.g., PUF, random number generator, etc.) can be accessed via a user space application and a device driver. FPGA based system on a chip (SoC) device drivers typically only provide a single function, passing data between an application layer and a secure device manager (SDM). However, as FPGAs are highly configurable and intended to be reprogrammed, the device driver model limits usability.

A second problem associated with traditional PUFs in FPGAs is that current FPGA solutions often only use PUF keys to encrypt and decrypt other cryptographic keys (e.g., wrap and unwrap non-PUF keys). Using PUF keys to wrap and unwrap cryptographic keys does not provide adequate security across different microservices as a single key can decrypt all data associated with the single key.

For example, in a data center, a programmable accelerator card (PAC) can be based on FPGA technology and commissioned to handle customized network traffic workloads. PUF usage within PACs typically protects advanced encryption standard (AES) keys by wrapping the AES key with a PUF key. Thus, even if a PUF key is provided as a consumable service, the data center can only offer one UID that services a single client transaction.

A third problem associated with traditional PUFs in FPGAs is that there is only one PUF Key generated per device. For example, when multiple cryptographic key requests are from multiple clients, prior techniques used with FPGAs wrap and unwrap all cryptographic keys with the same PUF key. Such technique is subjected to a break once run everywhere attack in which a single compromised PUF Key can break multiple secrets.

A fourth problem associated with traditional PUFs in FPGAs occurs when expanding a PUF key for a cryptographic service (e.g., as a seed for cryptographic functionality in a data center). In such a scenario, many FPGAs provide only one PUF key. To generate multiple PUF keys, service providers may install additional physical devices. For example, in current server implementation, one server rack may host multiple network cards. One PUF-enabled FPGA PAC solution typically produces one PUF key for one workload. Thus, in order to harvest more PUF keys, service providers often install multiple PACs in one server.

Client-server authentication exchanges secrets between clients and servers. Prior solutions only generate one unique ID and lack an efficient mechanism to derive further unique values based on a single PUF. Additionally, prior solutions do not allow distribution of an unclonable secret (e.g., a vPUF), derived from a single PUF, with multiple usage of a single unclonable secret. Prior solutions may derive random numbers from hardware random number generators, but such numbers are not truly random and are susceptible to collision, in which identical keys are generated via separate two generation processes.

Examples disclosed herein include microservice management circuitry, verification circuitry, and vPUF management circuitry which may derive and verify physical unclonable keys. Examples disclosed herein can further enable hardware microservice abstraction via software services to access derived PUF keys without compromising unclonable characteristics of the PUF key. Examples disclosed herein can generate a plurality of vPUFs for session keys for client services. Furthermore, each vPUF session key is also unclonable and provides a hardware root of trust. Examples disclosed herein provide an abstraction layer that is applicable to a variety of hardware architectures.

Turning to the figures, FIG. 1 is an illustration of a system to derive and verify physical unclonable keys. The example illustration of FIG. 1 includes an example system 100, an example server 102, example microservice management circuitry 104, example verification circuitry 106, example vPUF management circuitry 108, an example first client 110, an example first vPUF key 110a, an example second client 112, an example second vPUF key 112a, an example third client 114, an example third vPUF key 114a, and an example network 116.

The example system 100 to derive and verify physical unclonable keys may derive multiple vPUF keys from a single PUF. Therefore, the example clients 110, 112, and 114 can receive distinct vPUFs (e.g., secret keys, session keys, etc.) that are not susceptible to physical attack and based on a hardware root of trust of the server 102. In other words, a single PUF associated with the server 102 generates the vPUF keys 110a, 112a, and 114a. The vPUF key 110a, the second vPUF key 112a, and the third vPUF key 114a are all uniquely tied to the physical hardware of the server 102.

The example server 102 includes the example microservice management circuitry 104. The example microservice management circuitry 104 dynamically allocates software management services to govern hardware intellectual property (IP) microservices. The example microservice management circuitry 104 is further described in association with FIG. 2.

The example server 102 includes the example verification circuitry 106. The example verification circuitry 106 can verify a vPUF provided by a client (e.g., the example clients 110-114). For example, the vPUF verification circuitry 106 can verify the first vPUF 110a provided by the first client 110 to the example server 102. The vPUF verification circuitry communicates with the example vPUF management circuitry 108 to send a verification request and associated information to the vPUF management circuitry 108. The example verification circuitry 106 additionally may transmit results of verification via an indication (e.g., a pass/fail message) to the client 110, for example. The example verification circuitry 106 is further described in association with FIG. 2.

The example server 102 includes the example vPUF management circuitry 108. The example vPUF management circuitry 108 can generate a plurality of vPUFs from a single PUF. The example vPUF management circuitry 108 can directly interface with random number generation circuitry and PUF circuitry of an FPGA, for example. The vPUF management circuitry 108 can also transmit results of verification via an indication (e.g., a pass/fail message) to the client 110 and/or any other clients. The example vPUF management circuitry 108 is further described in association with FIG. 2.

FIG. 1 illustrates interactions between the example client 110, the example client 112, and the example client 114. The example clients 110, 112, and 114 interact with the server 102 to request services for consumption. For example, the example client 110 may request a seed for a cryptographic functionality. In response, the example server 102 may generate and provide the example first vPUF key 110a to the example first client 110. The example second client 112 may request a session ID key from the example server 102. In response, the example server 102 may generate a second vPUF key 112a, the second vPUF key 112a distinct form the first vPUF key 110a and based on the same PUF of the example server 102. The example server 102 may then send the example second vPUF key 112a to the example second client 112. The example third client 114 may request a second cryptographic key from the example server 102. In response, the example server 102 may generate a third vPUF key 114a based on the PUF of the server 102, the third vPUF key 114a distinct from both the first vPUF key 110a and the second vPUF key 112a. The example server may then send the example third vPUF key 114a to the example third client 114. In this way, the example server 102 has generated three distinct vPUF keys from a single PUF associated with the example server 102, and transmitted them via the network 116 to respective ones of the example clients 110, 112, and 114.

The example network 116 connects the example first client 110, the example second client 112, the example third client 114, and the example server 102. In the illustrated example of FIG. 1, the network 116 is the internet. However, in some examples the network 116 may be a local area network, a wide area network, a cellular network, etc. In some examples, the network 116 may instead be a direct connection to ones of the plurality of clients 110-114. In some examples, the example clients 110, 112, and 114 may not be separate from the server 102, and instead could be separate circuitry included within the server 102 to request and consume vPUF and associated cryptographic services.

Figure 2:
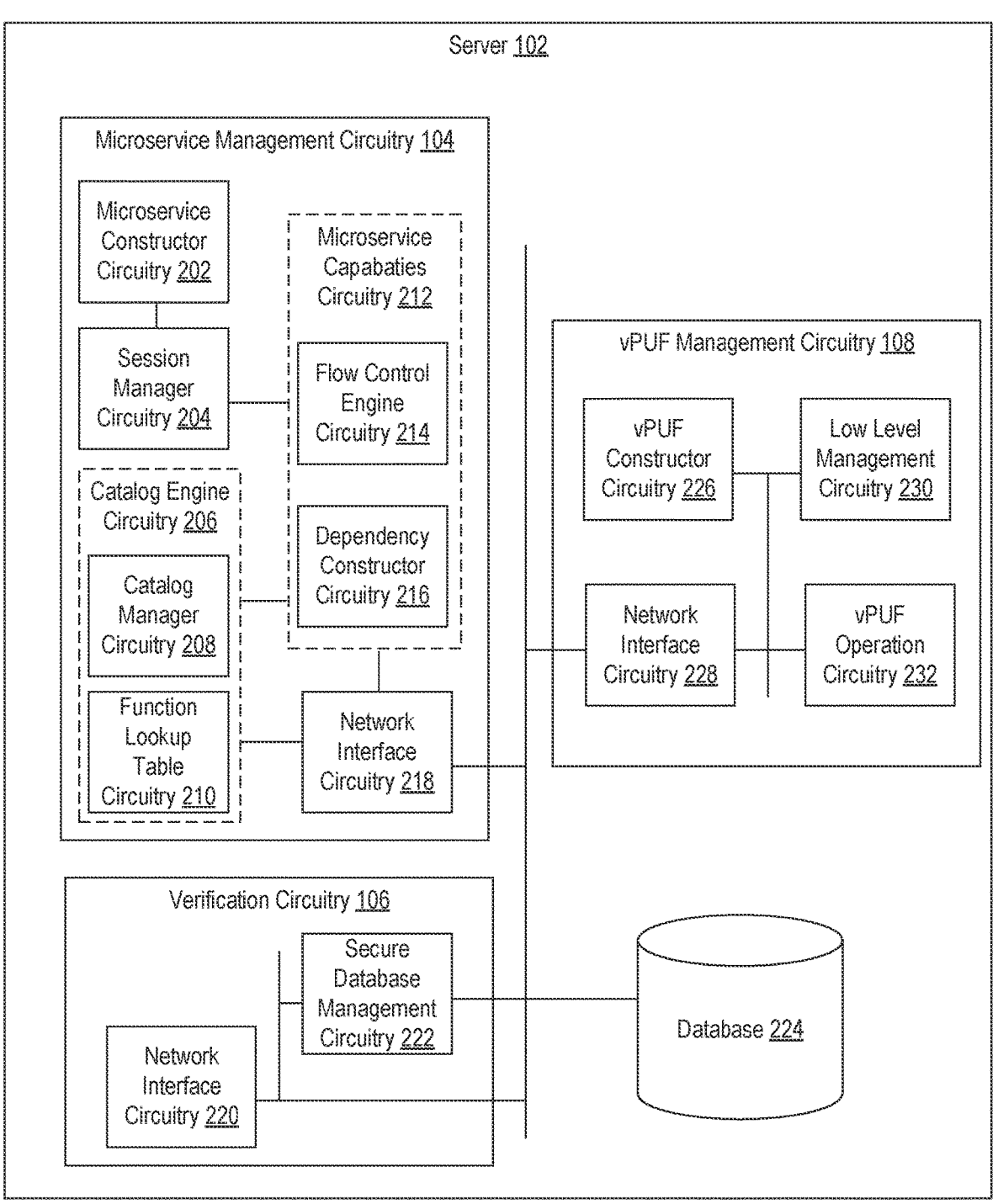
FIG. 2 is a block diagram of an example server to implement the system to derive and verify physical unclonable keys.

FIG. 2 is a block diagram of the example server 102 of FIG. 1 to derive and verify physical unclonable keys. The example server 102 of FIG. 2 may be instantiated (e.g., creating an instance of, bring into being for any length of time, materialize, implement, etc.) by processor circuitry such as a central processing unit executing instructions. Additionally or alternatively, the example server of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

FIG. 2 includes the example microservice management circuitry 104 of FIG. 1, example microservice constructor circuitry 202, example session manager circuitry 204, example catalog engine circuitry 206, example catalog manager circuitry 208, example microservice capabilities circuitry 212, example flow control engine circuitry 214, example dependency constructor circuitry 216, example first network interface circuitry 218, the example verification circuitry 106 of FIG. 1, example second network interface circuitry 220, example secure database management circuitry 222, the example vPUF management circuitry 108 of FIG. 1, example vPUF constructor circuitry 226, example third network interface circuitry 228, example low level management circuitry 230, and example vPUF operation circuitry 232.

The example microservice management circuitry 104 dynamically allocates software management services to govern hardware microservices, such as those of the vPUF management circuitry 108. The example microservice management circuitry 104 includes the microservice constructor circuitry 202. The example microservice constructor circuitry 202 provides a publicly available software microservices endpoint. Therefore, the example microservice constructor circuitry 202 communicates, via the example first network interface circuitry 218, to the example clients 110-114 of FIG. 1. For example, the microservice constructor circuitry 202 may provide an availability of ones of a plurality of microservices available to one or more of the example clients 110-114 of FIG. 1. The example microservices constructor circuitry 202 communicates with the example session manager circuitry 204 to handle microservice requests from clients (e.g., the example clients 110-114 of FIG. 1). For example, a session thread may be generated by the example session manager circuitry 204. In some examples, a single session thread can be associated with a user (e.g., a user of the client device 110). In some examples, when the user starts a session, the user can request multiple microservices in parallel. In some examples, the microservice management circuitry 104 may send a request to the vPUF management circuitry 108, the verification circuitry 106, and/or any other components of the example server 102 via a dynamic interface and a software metamodel construct. The example microservice management circuitry 104 is based on a dynamic interface based on a software metamodel construct. Therefore, the example microservice management circuitry 104 may function as an agent to manage various software recipes (e.g., lists of software actions). The framework of the microservice management circuitry 104 therefore allows a flexible software scalability. The microservice constructor circuitry 202 facilitates such features by simplifying consumption requests and is also expandable to include alternative microservices. In some examples, a recipe is generated by the microservice management circuitry 104. In some examples, the microservice management circuitry 104 associates a first vPUF with a first microservice and a second vPUF with a second microservice.

The example microservice capabilities circuitry 212 includes the example flow control engine circuitry 214 and the example dependency constructor circuitry 216. The example microservice capabilities circuitry 212 determines dependencies (e.g., an order of execution) between hardware IP libraries and software flows. The example dependency constructor circuitry 216 maps software context requests to software and/or hardware preconditions. For example, the dependency constructor circuitry 216 may transmit such information to the example flow control engine circuitry 214. A list of software actions may be returned from a data query, and an intelligent service of the dependency constructor circuitry 216 can compose relevant service.

The example flow control engine circuitry 214 manages software flows and communicates with the catalog engine circuitry 206. In some examples, the communication is carried out via software metamodel constructs to access hardware functionality. The example flow control engine circuitry 214 identifies and characterizes hardware functionality to support requests, package appropriate recipes, and execute a list of actions associated with the appropriate recipes. The example flow control engine circuitry 214 may then return an execution result to the microservice constructor circuitry 202.

The example catalog engine circuitry 206 includes the example catalog manager circuitry 208 and the example function lookup table circuitry 210. The example catalog engine circuitry 206 provides a selection of hardware IP containing microservices recipes. The example catalog engine circuitry 206 may act as a coordinator to interact with hardware IP. For example, the catalog engine circuitry 206 may perform registration, query, and execution of actions requested by the microservices capabilities circuitry 212. In some examples, the catalog engine circuitry 206 may communicate with low level device drivers via a software metamodel construct. The example catalog engine circuitry 206 includes the example function lookup table circuitry 210. The example function lookup table circuitry 210 may act as a registry containing an indication of available hardware microservices. The example function lookup table circuitry 210 associates actions from the flow control engine circuitry 214 to the low level execution steps in hardware IP, such as those interfaced by the example vPUF management circuitry 108.

The example verification circuitry 106 provides vPUF verification capabilities to the example server 102. The example verification circuitry 106 may receive, for example, a verification request from the example microservice management circuitry 104. The example verification request may include a vPUF key (e.g., the example first vPUF key 110a) for verification. The example verification circuitry 106 includes the example secure database management circuitry 222 that manages the example database 224. The example secure database management circuitry 222 may store and/or query the database 224 for a random number associated with a vPUF (e.g., a random number provided by hardware via the vPUF management circuitry 108). In some examples, the example secure database management circuitry 222 stores the vPUF and the random number in the example database 224, the vPUF acting as a key for a lookup table to retrieve the random number from the database 224.

After receiving the random number associated with the vPUF from the database 224, the example verification circuitry can send the example vPUF and the example random number to the vPUF management circuitry for hardware verification. The example second network interface circuitry 220 provides communication capabilities to the verification circuitry 106, allowing the example verification circuitry 106 to communicate with the example microservice management circuitry 104.

The example vPUF management circuitry 108 directly retrieves a PUF from hardware, accesses random numbers from hardware, performs a vPUF operation to generate a vPUF based on the random number and the PUF, and sends the result to the microservice management circuitry 104. The example vPUF management circuitry can also verify a vPUF when given the vPUF and the associated random number that was retrieved during vPUF creation.

The vPUF management circuitry 108 includes low level management circuitry 230 that manages hardware (e.g., FPGA hardware) including device specific security features (e.g., PUF's, cryptographic features, random number generation, etc.). In the example of FIG. 2, the example low level management circuitry 230 includes low level application programming interfaces that are able to access the secure cryptographic functions of the server 102. In some examples, device specific security features are included in secure device manager (SDM) circuitry. In the example of FIG. 2, the SDM circuitry is not exposed to public access and therefore provides a layer of protection against unauthorized use of the hardware SDM. In some examples, the SDM may be part of the vPUF management circuitry 108.

In some examples, the vPUF management circuitry 108 retrieves a random number and a PUF from a secure environment and generates a vPUF based on a trusted operation including the random number and the PUF. In some examples, the trusted operation is an exclusive or (XOR) operation. However, the trusted operation may instead be any type of function or set of functions that allows an input to be recovered from an output and an associated random number. In other words, if inputs to the function are a PUF key and the random number, the input PUF key value should be recoverable from the vPUF output and the random number. In some examples, the trusted operation includes an involutory function in which the trusted operation is its own inverse. An involutory function can simplify the architecture of the vPUF operation circuitry 232, as single circuitry may operate both verification and generation of vPUFs.

As described above, the vPUF management circuitry 108 can generate a plurality of vPUFs from a single PUF by retrieving additional random numbers from the low level management circuitry 230. For example, the vPUF may be a first vPUF, the vPUF management circuitry 108 to generate a second vPUF based on the PUF and a second random number retrieved from the low level management circuitry 230 and/or the vPUF constructor circuitry 226.

The example vPUF management circuitry 108 includes the example vPUF constructor circuitry 226. The example vPUF constructor circuitry 226 queries a PUF key and a random number from the low level management circuitry 230. The example random number and the example PUF key are provided to the vPUF operation circuitry 232 to perform a trusted operation (e.g., a XOR operation) to generate the vPUF. For example, a PUF key could have a value of 999. The vPUF operation circuitry 232 may then perform an XOR with a random number (e.g., 222) retrieved from the low level management circuitry 230 and provided to the vPUF operation circuitry 232 by the vPUF constructor circuitry 226. An output of the XOR operation could then be 825 (e.g., 999 XOR 222=825). Accordingly, the example value 825 is the example vPUF key provided to the vPUF constructor circuitry 226. The vPUF key is transmitted to the microservice management circuitry 104 and/or the verification circuitry 106 via the example third network interface circuitry 228. Details of the operations of the vPUF management circuitry, as well as example operations and interactions between the example microservice management circuitry 104, the example verification circuitry 106, and the example vPUF management circuitry 108 are provided in examples associated with FIGS. 3-7.

While an example manner of implementing the server 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example microservice management circuitry 104, the example vPUF management circuitry 108, the example verification circuitry 106, the example microservice constructor circuitry 202, the example session manager circuitry 204, the example catalog engine circuitry 206, the example catalog manager circuitry 208, the example function lookup table circuitry 210, the example microservice capabilities circuitry 212, the example flow control engine circuitry 214, the example dependency constructor circuitry 216, the example first network interface circuitry 218, the example second network interface circuitry 220, the example secure database management circuitry 222, the example database 224, the example vPUF constructor circuitry 226, the example third network interface circuitry 228, the example low level management circuitry 230, the example vPUF operation circuitry 232, more generally, the example server 102 of FIG. 2, may be implemented by hardware alone or by hardware in combination with software and/or firmware. Thus, for example, any of the example microservice constructor circuitry 202, the example session manager circuitry 204, the example catalog engine circuitry 206, the example catalog manager circuitry 208, the example function lookup table circuitry 210, the example microservice capabilities circuitry 212, the example flow control engine circuitry 214, the example dependency constructor circuitry 216, the example first network interface circuitry 218, the example second network interface circuitry 220, the example secure database management circuitry 222, the example database 224, the example vPUF constructor circuitry 226, the example third network interface circuitry 228, the example low level management circuitry 230, the example vPUF operation circuitry 232, more generally, the example server 102 of FIG. 2, and/or, more generally, the example server 102 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example server 102 of FIG. 1 may include one or more elements, processes, and/or devices in addition to, or instead of, those illustrated in FIG. 2, and/or may include more than one of any or all of the illustrated elements, processes and devices.

Figure 3:
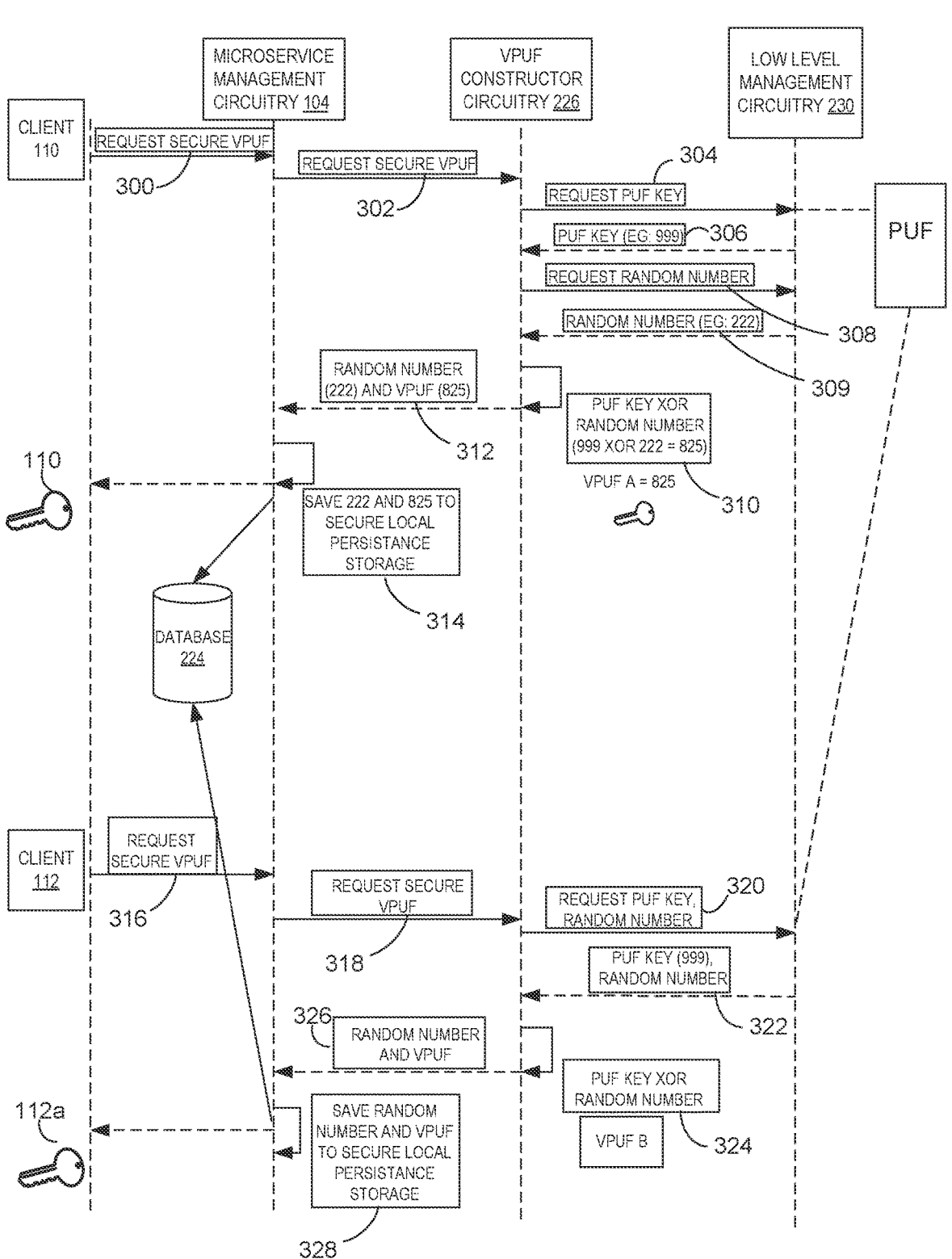
FIG. 3 is a sequence diagram of an example process to generate multiple vPUF keys.

FIG. 3 is a sequence diagram that illustrates how the example microservice management circuitry 104, the example vPUF constructor circuitry 226, and the example low level management circuitry 230 may interact to generate multiple vPUF keys from a single PUF. At block 300, the example microservice management circuitry 104 requests a secure vPUF. For example, the microservice constructor circuitry 202 may receive a request from the example client 110 of FIG. 1 requesting a vPUF. At block 302, the example first network interface circuitry 218 communicates with the vPUF constructor circuitry 226 to transmit the vPUF request to the vPUF constructor circuitry 226.

At block 304, the example vPUF management circuitry 108 has received the request for a vPUF key from the microservice management circuitry 104. In response, the vPUF constructor circuitry 226 sends a request for a PUF key. In the example of FIG. 3, the low level management circuitry 230 interacts with an FPGA that includes a single PUF key. At block 306 the example low level management circuitry 230 retrieves the PUF key (e.g., a number 999) from hardware and sends the PUF key to the vPUF constructor circuitry. In turn, at block 308, the example vPUF constructor circuitry 226 requests a random number from the low level management circuitry 230. At block 309, the example low level management circuitry 230 retrieves a random number from the FPGA hardware (e.g., a number 222) and provides the random number to the example vPUF constructor circuitry.

Block 310 illustrates the vPUF operation circuitry 232 performing an XOR operation on the PUF key (e.g., the number 999) and the random number (e.g., the number 222). An XOR operation may be a bitwise XOR operation in which each bit of two numbers are compared, with unlike bits producing a 1, and similar bits producing a 0. For example, an output of an XOR operation between 999 and 222 produces the number 825. Thus, the value 825 serves as the vPUF (e.g., at least a portion of a vPUF key).

At block 312, the example third network interface circuitry 228 of the vPUF constructor circuitry 226 transmits the vPUF (e.g., the number 825) and the random number retrieved at block 309 (e.g., the number 222) to the example microservice management circuitry 104. In turn, at block 314, the example first network interface circuitry 218 stores the random number (e.g., the number 222) and the vPUF (e.g., the number 825) with the example database 224. vPUFs and random numbers can be stored together and/or associated within the database 224. For example, the vPUF key may be stored in association with the random number used to generate the vPUF. Then, when the vPUF key is provided to the database 224, the database can retrieve the associated random number.

FIG. 3 additionally illustrates a second vPUF key being generated via a similar process to the first. At blocks 316 to 320 the client's request for a vPUF is transmitted from the example microservice management circuitry to the example vPUF constructor circuitry 226 and then to the example low level management circuitry 230. At block 320, the PUF key (e.g., the same unique PUF key requested at block 304) is requested. Additionally, a second random number (e.g., a number different than 222) is requested. For example, the second random number may be 452. At block 324, the example vPUF operation circuitry 232 performs a second trusted XOR operation (e.g., 452 XOR 999) and generates a second vPUF (e.g., the number 547). At block 326, the example vPUF constructor circuitry 226 provides the random number and the vPUF to the example microservice management circuitry 104. At block 328, the second random number and the second vPUF are stored to the database by the example microservice management circuitry 104 before being provided to the example client 112.

Figure 4:
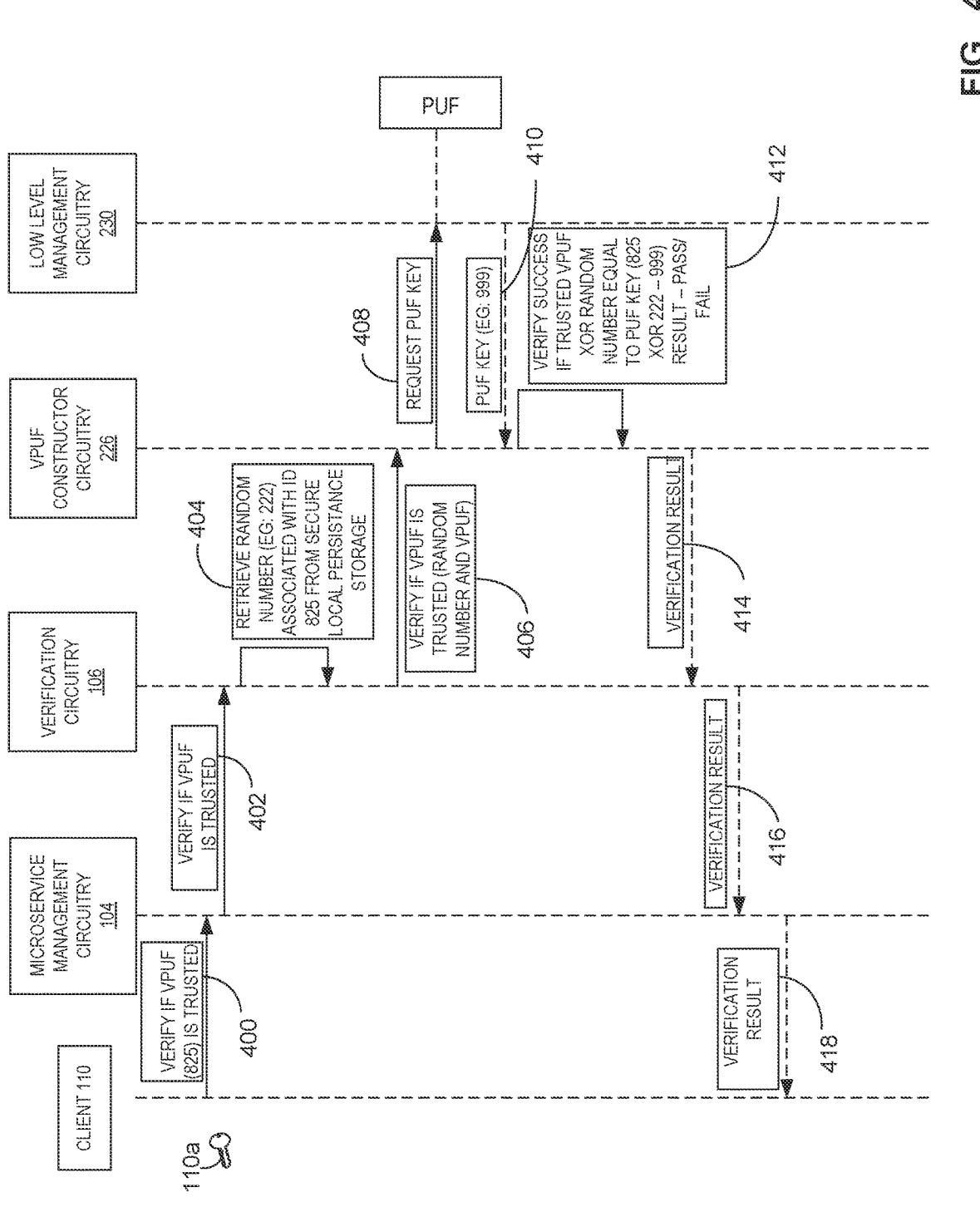
FIG. 4 is a sequence diagram of an example process to verify a vPUF key.

FIG. 4 is a sequence diagram that illustrates how the example microservice management circuitry 104, the example vPUF constructor circuitry 226, the example verification circuitry 106, and the example low level management circuitry 230 may interact to verify a vPUF. At block 400, the example client provides the vPUF key 110a to the microservice management circuitry 104. In turn, at block 402, the vPUF key 110a is transmitted, via the first network interface circuitry 218, to the verification circuitry 106. At block 404, the example secure database management circuitry 222 retrieves the random number associated with the vPUF key 110a from the example database 224. Next, at block 406, the example second network interface circuitry 220 provides the random number (e.g., the number 222) and the vPUF key 110a to the example vPUF constructor circuitry 226. The vPUF constructor circuitry can then request the PUF key from the low level management circuitry 230 at block 408. At block 410, the example low level management circuitry 230 provides the PUF key to the vPUF constructor circuitry 226. At block 412, the example vPUF operation circuitry 232 performs the trusted operation (e.g., XOR operation) on the vPUF and the random number (e.g., 222 XOR 825). Then, if the output matches the PUF key, the verification result is a success. Otherwise, the vPUF verification result is a failure. At block 414, the vPUF verification result is transmitted from the example third network interface circuitry 228 to the example verification circuitry 106. At block 416, the vPUF verification result is transmitted from the example second network interface circuitry 220 to the example first network interface circuitry 218. At block 418, the verification result is provided to the client 110.

Figure 5:
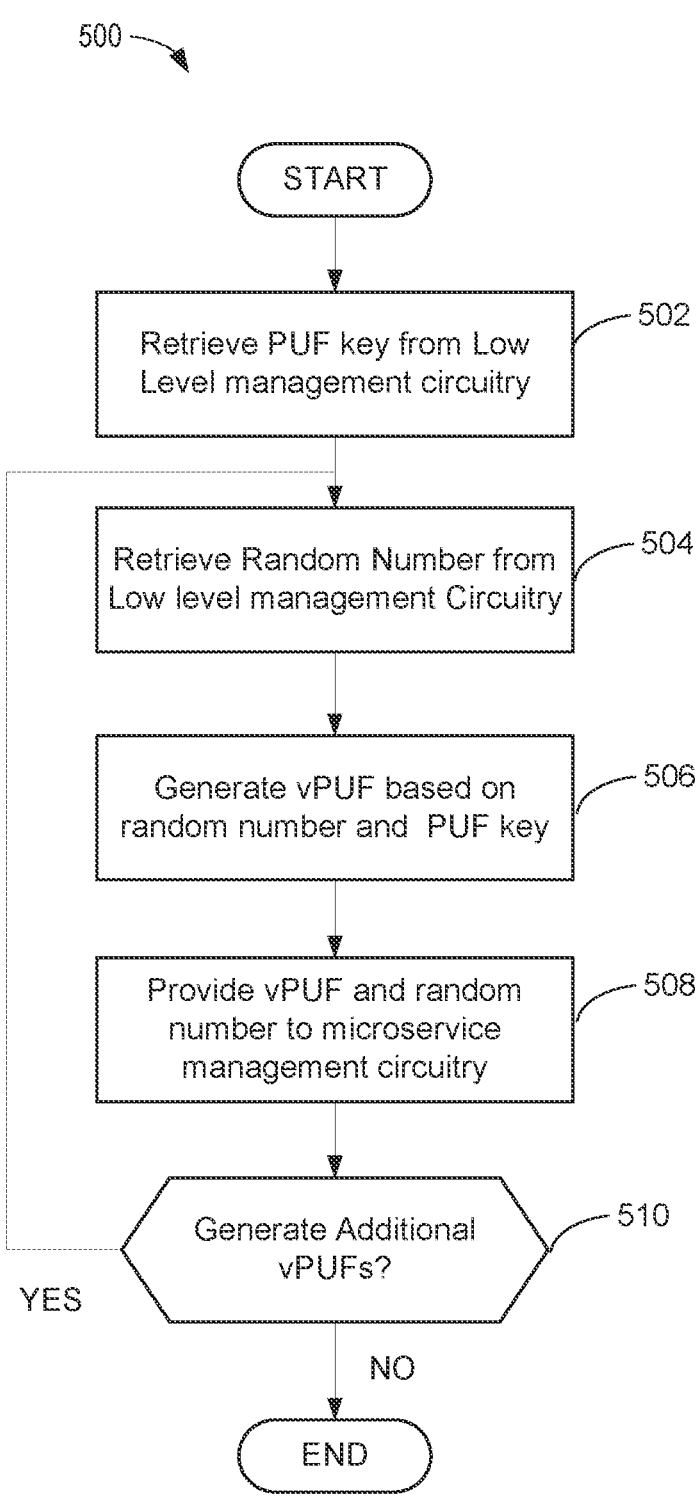
FIG. 5 is a flowchart representative of example machine readable instructions and/or example operations that may be executed by example processor circuitry to implement the vPUF management circuitry of FIG. 2 to generate a vPUF.
Figure 6:
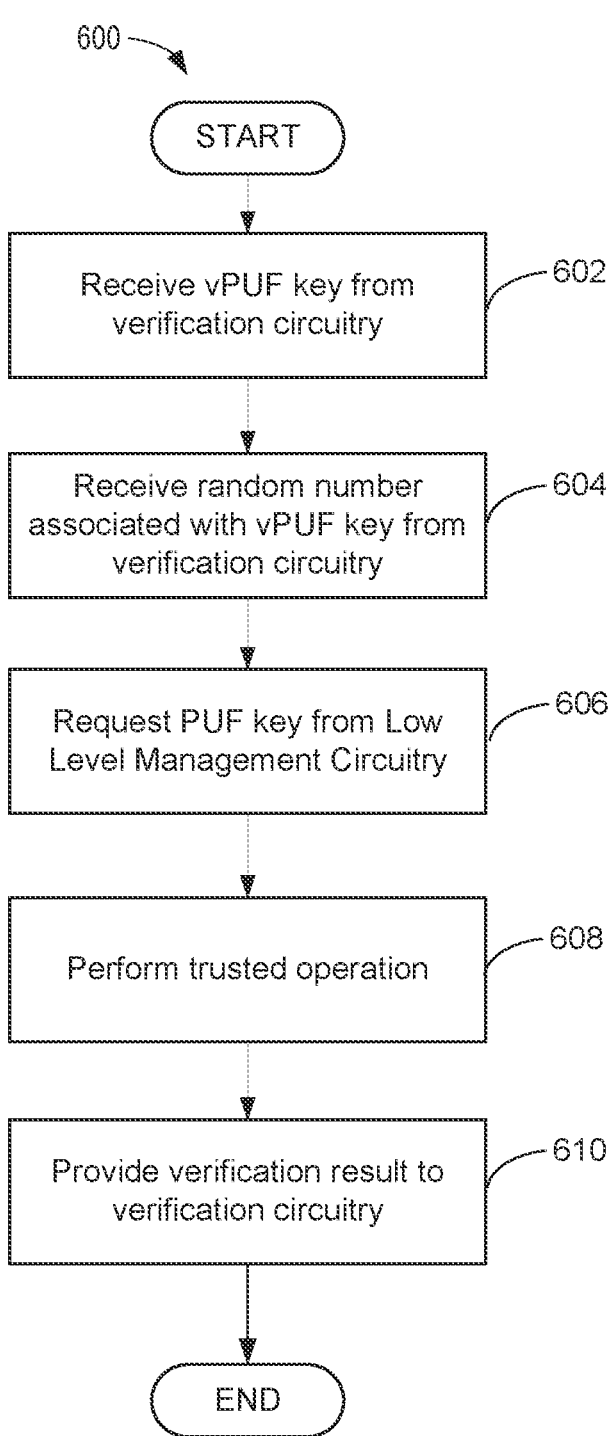
FIG. 6 is a flowchart representative of example machine readable instructions and/or example operations that may be executed by example processor circuitry to implement the vPUF management circuitry of FIG. 2 to verify a vPUF.
Figure 7:
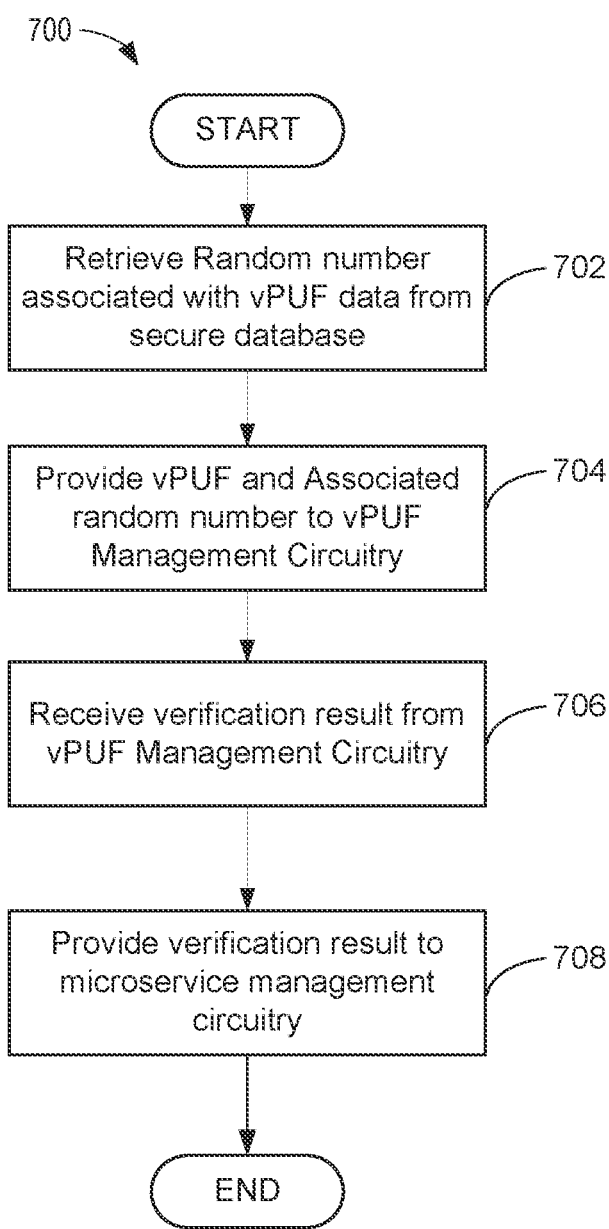
FIG. 7 is a flowchart representative of example machine readable instructions and/or example operations that may be executed by example processor circuitry to implement the verification circuitry of FIG. 2 to verify a vPUF.

A flowchart representative of example hardware logic circuitry, machine readable instructions, hardware implemented state machines, and/or any combination thereof for implementing the server 102 of FIG. 2 is shown in FIGS. 5-7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 4-7, many other methods of implementing the example server 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to generate at least one vPUF from a PUF. The machine readable instructions and/or the operations 500 of FIG. 5 begin at block 502, at which the vPUF constructor circuitry 226 of FIG. 2 retrieves a PUF key from the example low level management circuitry 230 of FIG. 2. The instructions continue at block 504 where the example vPUF constructor circuitry 226 of FIG. 2 retrieves a random number from the example low level management circuitry 230 of FIG. 2.

Next, at block 506, the example vPUF operation circuitry 232 of FIG. 2 generates a vPUF based on the random number and the PUF key. For example, the vPUF operation circuitry 232 of FIG. 2 may perform an XOR operation on the random number and the PUF key to generate a vPUF. At block 508, the example third network interface circuitry 228 of FIG. 2 provides the vPUF and the random number to the example microservice management circuitry 104 of FIG. 2. At block 510, the example microservice management circuitry 104 of FIG. 2 and/or the example vPUF management circuitry 108 of FIG. 2 determine if additional vPUFs are to be generated. If so, the instructions continue at block 504. Otherwise, the instructions of FIG. 5 end.

FIG. 6 is a flowchart representative of example machine readable instructions and/or example operations 600 that may be executed and/or instantiated by processor circuitry to verify a vPUF. The machine readable instructions and/or the operations 600 of FIG. 6 begin at block 602, at which the example vPUF management circuitry 108 of FIG. 2 receives a vPUF key from the example verification circuitry 106 of FIG. 2. At block 604, the example second network interface circuitry 220 of FIG. 2 receives a random number associated with the vPUF key from the example verification circuitry 106 of FIG. 2. At block 606, the example low level management circuitry 230 of FIG. 2 request a PUF key via the low level management circuitry 230 of FIG. 2. At block 608 the example vPUF operation circuitry 232 of FIG. 2 performs a trusted operation with the vPUF and the random number. If an output of the trusted operation and the PUF match, a successful verification results. Otherwise, the example vPUF management circuitry 108 of FIG. 2 will provide a negative verification result. At block 610, the example third network interface circuitry 228 provides the verification result to the example verification circuitry 106 of FIG. 2. The example instructions of FIG. 6 end.

FIG. 7 is a flowchart representative of example machine readable instructions and/or example operations 700 that may be executed and/or instantiated by processor circuitry to provide verification capabilities to the microservice management circuity 104 of FIG. 2. The machine readable instructions and/or the operations 700 of FIG. 7 begin at block 702, at which the example secure database management circuitry 222 retrieves a random number associated with a vPUF key from the database 224 of FIG. 2. At block 704, the example second network interface circuitry 220 provides the vPUF and the associated random number to the vPUF management circuitry 108 of FIG. 2. At block 706, the example vPUF verification circuitry 106 receives a verification result from the example vPUF management circuitry 108 of FIG. 2. At block 708, the example second network interface circuitry 220 provide the verification result to the example microservice management circuitry 104 of FIG. 2. The example instructions of FIG. 7 end.

Figure 8:
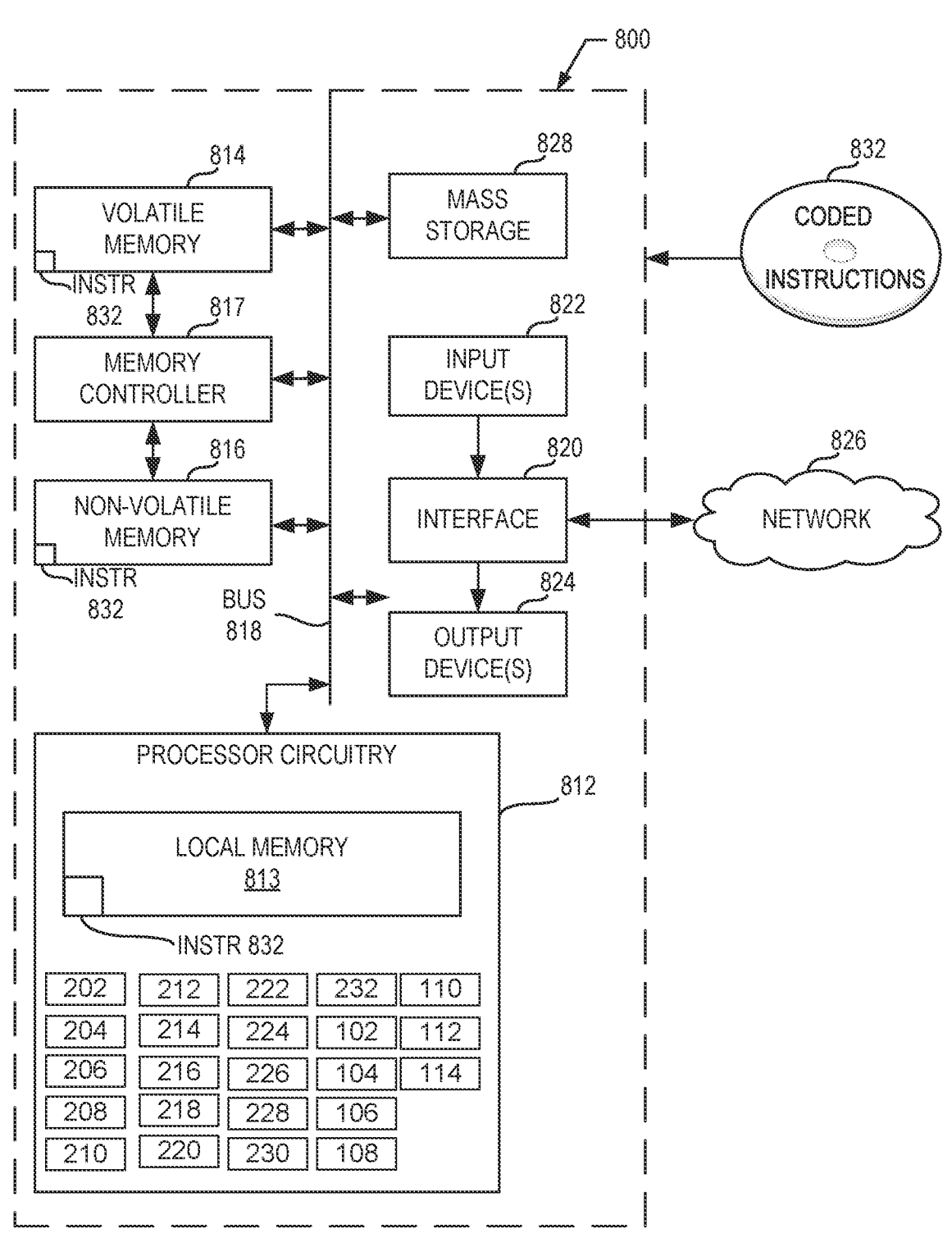
FIG. 8 is a block diagram of an example processing platform including processor circuitry structured to execute the example machine readable instructions and/or the example operations of FIGS. 5-7 to implement the server of FIG. 2.

FIG. 8 is a block diagram of an example processor platform 800 structured to execute and/or instantiate the machine readable instructions and/or the operations of FIGS. 5-7 to implement the server 102 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example microservice management circuitry 104, the example vPUF management circuitry 108, the example verification circuitry 106, the example microservice constructor circuitry 202, the example session manager circuitry 204, the example catalog engine circuitry 206, the example catalog manager circuitry 208, the example function lookup table circuitry 210, the example microservice capabilities circuitry 212, the example flow control engine circuitry 214, the example dependency constructor circuitry 216, the example first network interface circuitry 218, the example second network interface circuitry 220, the example secure database management circuitry 222, the example database 224, the example vPUF constructor circuitry 226, the example third network interface circuitry 228, the example low level management circuitry 230, the example vPUF operation circuitry 232, more generally, the example server 102 of FIG. 2 and/or the example system 100 of FIG. 1.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 832, which may be implemented by the machine readable instructions of FIGS. 5-7, may be stored in the mass storage device 828, in the volatile memory 814, in the non-volatile memory 816, and/or on a removable non-transitory computer readable storage medium such as a CD or DVD.

Figure 9:
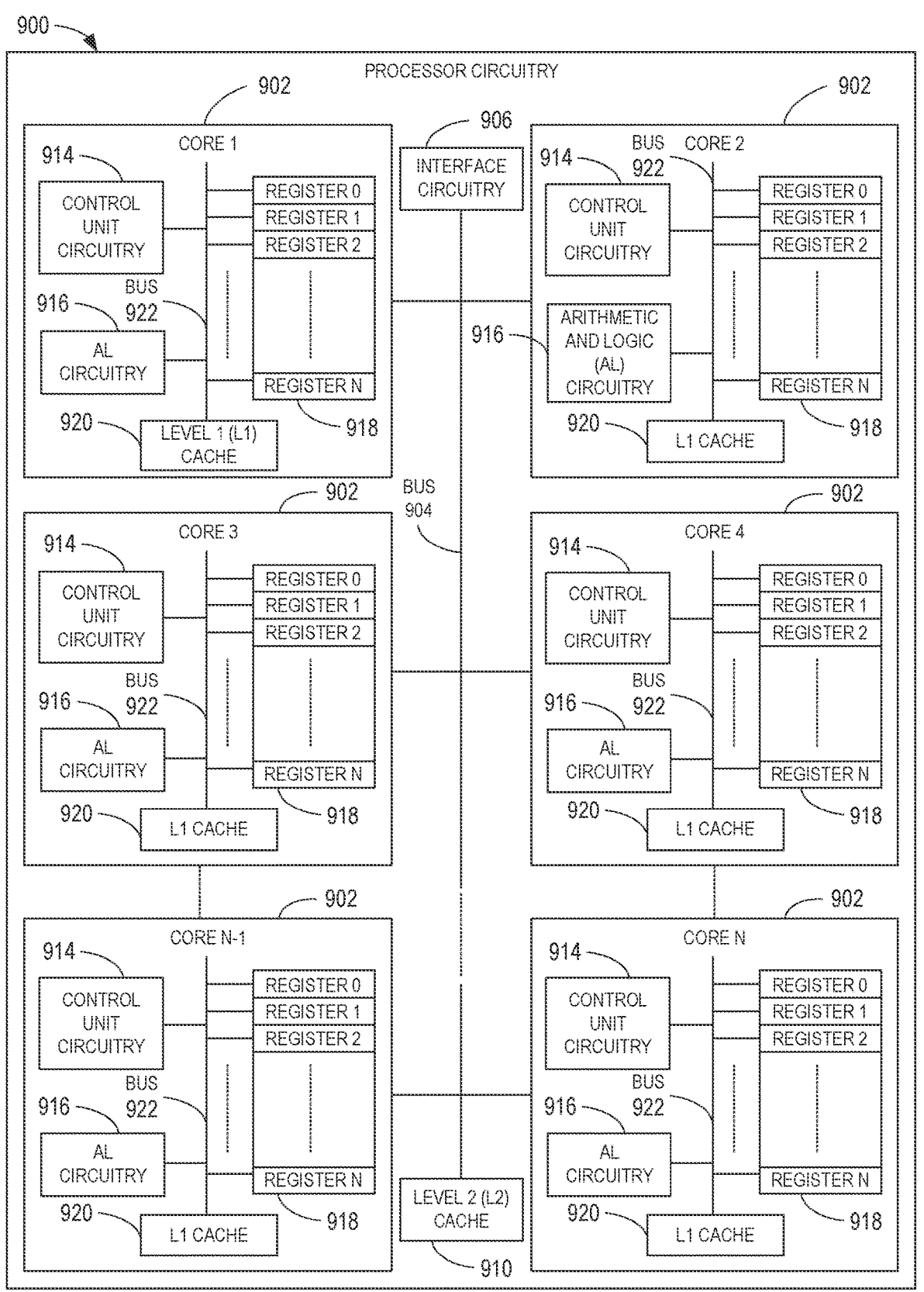
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a general purpose microprocessor 900. The general purpose microprocessor circuitry 900 executes some or all of the machine readable instructions of the flowcharts of FIGS. 5-7 to effectively instantiate the circuitry of FIG. 2 as logic circuits to perform the operations corresponding to those machine readable instructions. In some such examples, the circuitry of FIG. 2 is instantiated by the hardware circuits of the microprocessor 900 in combination with the instructions. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIG. 5-7.

The cores 902 may communicate by a first example bus 904. In some examples, the first bus 904 may implement a communication bus to effectuate communication associated with one(s) of the cores 902. For example, the first bus 904 may implement at least one of an Inter-Integrated Circuit (I2C) bus, a Serial Peripheral Interface (SPI) bus, a PCI bus, or a PCIe bus. Additionally or alternatively, the first bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages.

The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
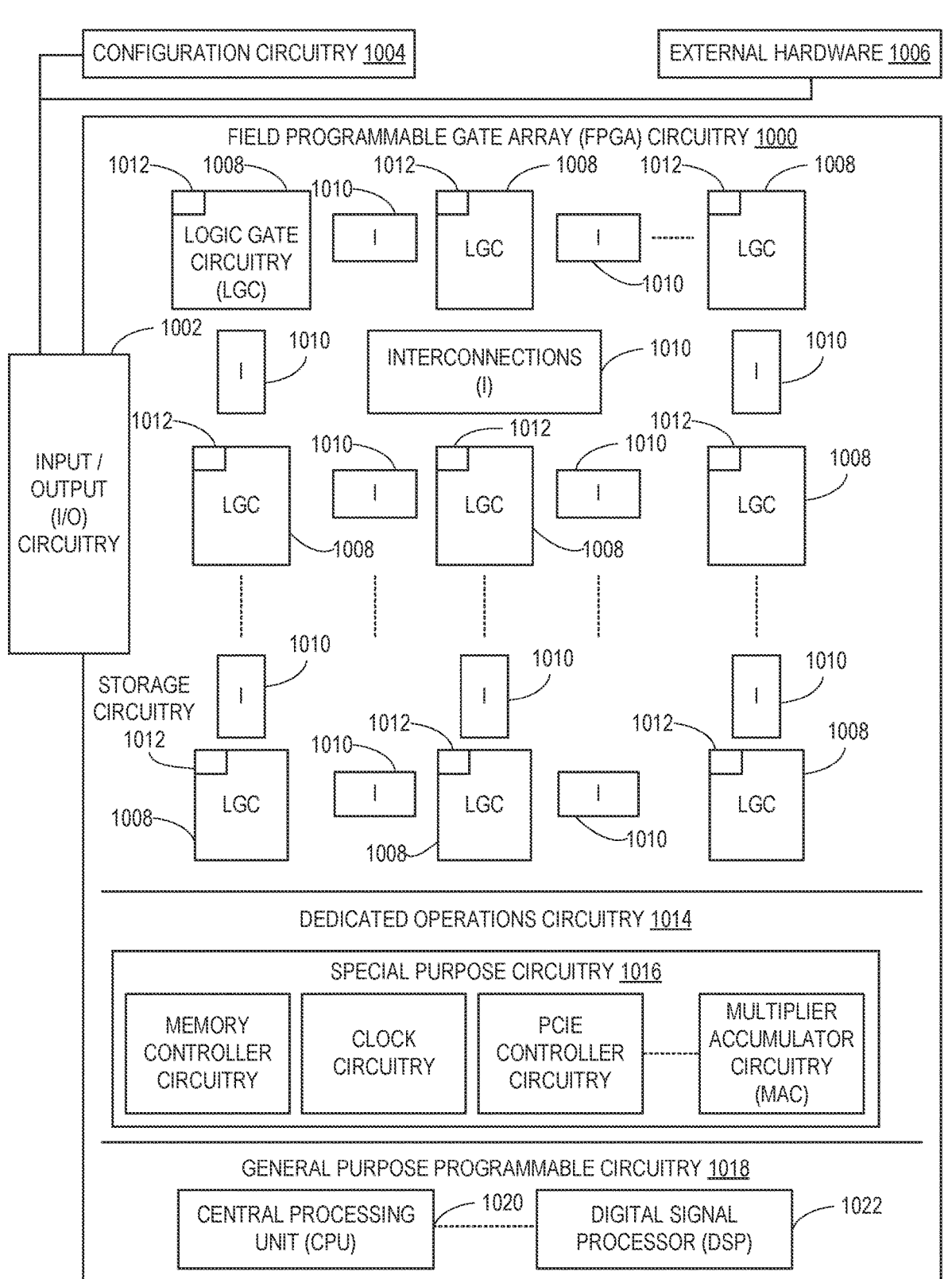
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowchart of FIGS. 4-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowchart of FIGS. 5-7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowchart of FIGS. 5-7. As such, the FPGA circuitry 1000 may be structured to effectively instantiate some or all of the machine readable instructions of the flowcharts of FIGS. 5-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 5-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/

ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 5-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowchart of FIGS. 5-7 may be executed by one or more of the cores 902 of FIG. 9, a second portion of the machine readable instructions represented by the flowchart of FIGS. 5-7 may be executed by the FPGA circuitry 1000 of FIG. 10, and/or a third portion of the machine readable instructions represented by the flowchart of FIGS. 5-7 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 912 of FIG. 9 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
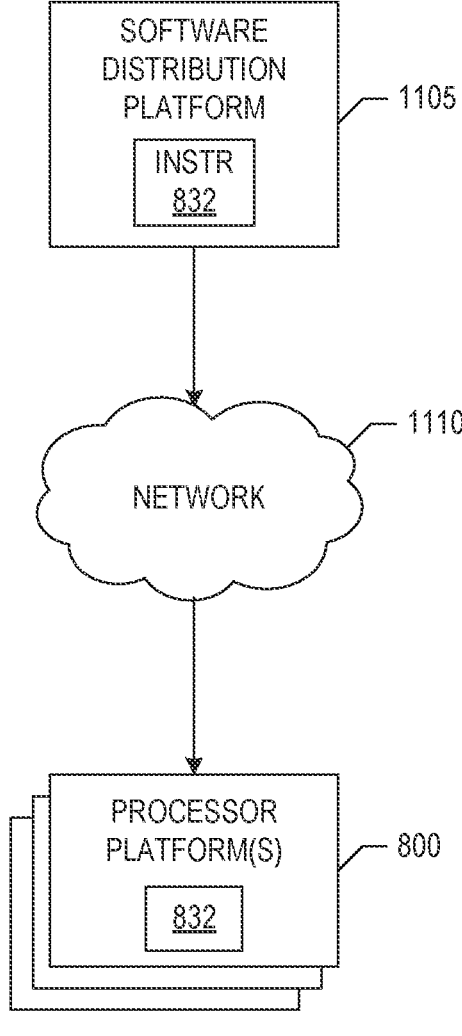
FIG. 11 is a block diagram of an example software distribution platform (e.g., one or more servers) to distribute software (e.g., software corresponding to the example machine readable instructions of FIGS. 3-8 to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 500, 600, 700 of FIGS. 5-7, as described above. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 832 of FIG. 8, may be downloaded to the example processor platform 800, which is to execute the machine readable instructions 832 to implement the system to derive and verify physical unclonable keys 100 of FIG. 1. In some example, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that derive and verify physical unclonable keys. Disclosed systems, methods, apparatus, and articles of manufacture improve the efficiency of using a computing device by herein improve the cryptographic functionality of electronic circuits by generating multiple vPUF keys from a single PUF key. Furthermore, examples disclosed herein allow device manufacturers to scale PUFs efficiently. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to derive and verify virtual physical unclonable keys are disclosed herein. Further examples and combinations thereof include the following:

Example 1 includes an apparatus comprising instructions in the apparatus, and processor circuitry to execute the instructions to retrieve identifying information and a physical unclonable function (PUF) from a secure environment, generate a virtual PUF (vPUF) based on a trusted operation including the identifying information and the PUF, and store the vPUF and the identifying information in a persistent storage.

Example 2 includes the apparatus of example 1, wherein the identifying information is a random number.

Example 3 includes the apparatus of example 2, wherein the processor circuitry is to execute the instructions to retrieve the random number from the persistent storage, generate an output based on a second trusted operation including the random number and the vPUF, and verify the vPUF based on a comparison of the output and the PUF.

Example 4 includes the apparatus of example 1, wherein the vPUF is a first vPUF, the processor circuitry to execute the instructions to generate a second vPUF based on the PUF and a second random number retrieved from the secure environment.

Example 5 includes the apparatus of example 1, wherein the vPUF is associated with a microservice.

Example 6 includes the apparatus of example 1, wherein the trusted operation includes an involutory function in which the trusted operation is its own inverse.

Example 7 includes the apparatus of example 6, wherein the trusted operation includes an XOR operation.

Example 8 includes a non-transitory computer readable medium comprising instructions, which, when executed, cause processor circuitry to at least retrieve identifying information and a physical unclonable function (PUF) from a secure environment, generate a virtual PUF (vPUF) based on a trusted operation including the identifying information and the PUF, and store the vPUF and the identifying information in a persistent storage.

Example 9 includes the non-transitory computer readable medium of example 8, wherein the identifying information is a random number.

Example 10 includes the non-transitory computer readable medium of example 9, wherein the instructions, when executed, cause the processor circuitry to retrieve the random number from the persistent storage, generate an output based on a second trusted operation including the random number and the vPUF, and verify the vPUF based on a comparison of the output and the PUF.

Example 11 includes the non-transitory computer readable medium of example 8, wherein the vPUF is a first vPUF, and wherein the instructions, when executed, cause the processor circuitry generate a second vPUF based on the PUF and a second random number retrieved from the secure environment.

Example 12 includes the non-transitory computer readable medium of example 8, wherein the vPUF is associated with a microservice.

Example 13 includes the non-transitory computer readable medium of example 8, wherein the trusted operation includes an involutory function in which the trusted operation is its own inverse.

Example 14 includes the non-transitory computer readable medium of example 8, wherein the trusted operation includes an XOR operation.

Example 15 includes a method comprising retrieving identifying information and a physical unclonable function (PUF) from a secure environment, generating a virtual PUF (vPUF) based on a trusted operation including the identifying information and the PUF, and storing the vPUF and the identifying information in a persistent storage.

Example 16 includes the method of example 15, wherein the identifying information is a random number.

Example 17 includes the method of example 16, further including retrieving the random number from the persistent storage, generating an output based on a second trusted operation including the random number and the vPUF, and verifying the vPUF based on a comparison of the output and the PUF.

Example 18 includes the method of example 15, wherein the vPUF is a first vPUF, further including generating a second vPUF based on the PUF and a second random number retrieved from the secure environment.

Example 19 includes the method of example 15, wherein the vPUF is associated with a microservice.

Example 20 includes the method of example 15, wherein the trusted operation includes an involutory function in which the trusted operation is its own inverse.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
physical unclonable function (PUF) circuitry to provide a PUF;
number generation circuitry;
instructions; and
at least one programmable circuit to be programmed based on the instructions to:
generate a first virtual PUF (vPUF) based on a first message from a first client device, the first vPUF based on a trusted operation performed with a first number from the number generation circuitry and the PUF;
generate a second vPUF based on a second message from a second client device, the second vPUF based on the trusted operation performed with a second number from the number generation circuitry and the PUF;
cause transmission of the first vPUF to the first client device and cause transmission of the second vPUF to the second client device;
cause storage of the first vPUF, the first number, the second vPUF and the second number in a persistent storage; and
in response to a verification request from a third client device, the verification request including a third vPUF, use the third vPUF to look up a third number in the persistent storage, generate a fourth vPUF based on the trusted operation performed with the third number and the PUF, compare the fourth vPUF to the third vPUF to determine a verification result, and provide the verification result to the third client device.

2. The apparatus of claim 1, wherein the first number is a random number.

3. The apparatus of claim 1, wherein one or more of the at least one programmable circuit is to generate a third vPUF based on a third message from a third client device, the third vPUF based on the PUF and a third number from the number generation circuitry.

4. The apparatus of claim 1, wherein the first vPUF is associated with a microservice.

5. The apparatus of claim 1, wherein the trusted operation includes an involutory function.

6. The apparatus of claim 5, wherein the involutory function is an XOR operation.

7. The apparatus of claim 1, wherein one or more of the at least one programmable circuit is to:
determine the third vPUF is valid based on the third vPUF matching the fourth vPUF; and
determine the third vPUF is invalid based on the third vPUF not matching the fourth vPUF.

8. The apparatus of claim 1, wherein the first message is a request from the first client device for a session key to access a microservice, and one or more of the at least one programmable circuit is to cause the transmission of the first vPUF to the first client device to occur as a response to the request.

9. A non-transitory computer readable medium comprising instructions to cause at least one programmable circuit to at least:
retrieve a physical unclonable function (PUF) from PUF circuitry:
generate a first virtual PUF (vPUF) based on a first message from a first client device, the first vPUF based on a trusted operation performed with a first number from number generation circuitry and the PUF;
generate a second vPUF based on a second message from a second client device, the second vPUF based on the trusted operation performed with a second number from the number generation circuitry and the PUF;
cause transmission of the first vPUF to the first client device and cause transmission of the second vPUF to the second client device;
cause storage of the first vPUF, the first number, the second vPUF and the second number in a persistent storage; and
in response to a verification request from a third client device, the verification request including a third vPUF, use the third vPUF to look up a third number in the persistent storage, generate a fourth vPUF based on the trusted operation performed with the third number and the PUF, compare the fourth vPUF to the third vPUF to determine a verification result, and provide the verification result to the third client device.

10. The non-transitory computer readable medium of claim 9, wherein the instructions are to cause one or more of the at least one programmable circuit to generate a third vPUF based on a third message from a third client device, the third vPUF based on the PUF and a third number from the number generation circuitry.

11. The non-transitory computer readable medium of claim 9, wherein the first vPUF is associated with a microservice.

12. The non-transitory computer readable medium of claim 9, wherein the trusted operation includes an involutory function.

13. The non-transitory computer readable medium of claim 12, wherein the involutory function is an XOR operation.

14. A method comprising:

retrieving a physical unclonable function (PUF) from PUF circuitry:

generating a first virtual PUF (vPUF) based on a first message from a first client device, the first vPUF based on a trusted operation performed with a first number from number generation circuitry and the PUF;

generating a second vPUF based on a second message from a second client device, the second vPUF based on the trusted operation performed with a second number from the number generation circuitry and the PUF;

transmitting the first vPUF to the first client device and transmitting the second vPUF to the second client device;

storing the first vPUF, the first number, the second vPUF and the second number in a persistent storage; and in response to a verification request from a third client device, the verification request including a third vPUF, using the third vPUF to look up a third number in the persistent storage, generating a fourth vPUF based on the trusted operation performed with the third number and the PUF, comparing the fourth vPUF to the third vPUF to determine a verification result, and providing the verification result to the third client device.

15. The method of claim 14, including generating a third vPUF based on a third message from a third client device, the third vPUF based on the PUF and a third number from the number generation circuitry.

16. The method of claim 14, wherein the first vPUF is associated with a microservice.

17. The method of claim 16, wherein the trusted operation includes an involutory function.

18. The method of claim 17, wherein the involutory function is an XOR operation.

* * * * *